United States Patent [19]

Burgi

[11] 4,055,327
[45] Oct. 25, 1977

[54] CAMPER LIFTER DEVICE

[76] Inventor: Henry R. Burgi, 1193 Florida St., Imperial Beach, Calif. 92032

[21] Appl. No.: 763,791

[22] Filed: Jan. 31, 1977

Related U.S. Application Data

[63] Continuation of Ser. No. 620,946, Oct. 9, 1975, abandoned.

[51] Int. Cl.² .............................................. B66F 7/26
[52] U.S. Cl. ..................................................... 254/47
[58] Field of Search ....................... 254/45, 47, 48, 4 R

[56] References Cited

U.S. PATENT DOCUMENTS

| | | | |
|---|---|---|---|
| 3,254,874 | 6/1966 | Thompson | 254/47 |
| 3,831,791 | 8/1974 | Gonzales | 254/4 R |
| 3,881,689 | 5/1975 | Bury | 254/45 |

Primary Examiner—Robert C. Watson
Attorney, Agent, or Firm—Verbeck and Haller

[57] ABSTRACT

A camper lifter device for lifting and transporting campers comprising an adjustable frame having first and second side members with a lifting assembly adjustably carried on each side frame member. A lifting cable is attached via pulleys to two angle iron lifters slidably carried on each lifting structure dimensioned for fitting underneath each side of a camper to be lifted or lowered with the cables being wrapped around a cable drum mounted on a front structural member of the frame for effectively shortening and lengthening the cable and lifting and lowering the two lifters slidably coupled to the lifting mechanism. First and second structural members are removably attached to the first and second side members for carrying the camper during periods when the camper is not in use but it is desired to leave the camper on the lifter device, i.e.; once the camper is removed from a truck bed it can be lowered onto the first and second structural members thereby with its weight resting on the frame itself and not on the lifters. This insures stability and portability during storage periods.

2 Claims, 1 Drawing Figure

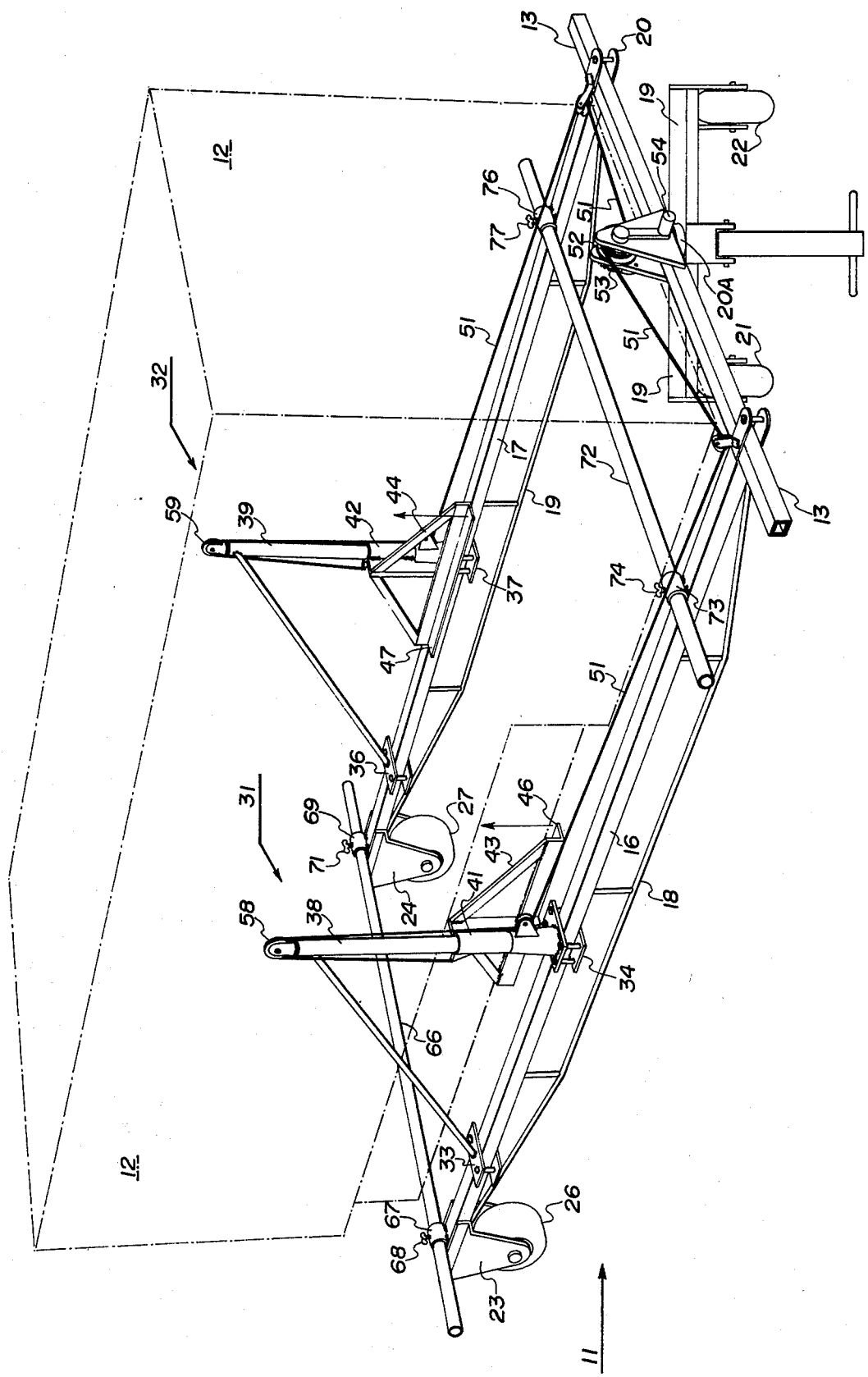

CAMPER LIFTER DEVICE

This is a continuation of application Ser. No. 620,946, filed Oct. 9, 1975 now abandoned.

BRIEF DESCRIPTION OF THE INVENTION

The present invention relates to a camper lifter device and, more particularly, to a camper lifter device adjustably coupled to a camper for raising and lowering thereof.

According to the invention, a camper lifter device is provided having a frame consisting of three main frame members adjustably coupled together for camper width variations which are mounted and carried by four wheels. A pair of lift assemblies are adjustably coupled to each of two side frame members each having an angle iron lifter facing inboard for removable attachment to the bottom of each side of a camper. A lifting cable assembly is provided with a drum for effectively reducing and lengthening the cable coupled by pulleys to each lift assembly for raising and lowering the lift mechanism and hence the camper on the lifter mechanisms. The entire device is dimensioned for raising a camper from a floor position or ground level position to a truck bed level and vice versa. First and second structural members are removably attached to the first and second side members for carrying the camper during periods when the camper is not in use but it is desired to leave the camper on the lifter device, i.e.; once the camper is removed from a truck bed it can be lowered onto the first and second structural members thereby with its weight resting on the frame itself and not on the lifters. This insures stability and portability during storage periods.

An object of the present invention is the provision of an improved camper lifter device.

Another object of the invention is the provision of a camper lifter device which can be utilized in installing and removing a camper from a truck bed.

A further object of the invention is the provision of a camper lifter device which is adjustable in width for accommodating various sized campers.

A still further object of the invention is the provision of a camper lifter device which is inexpensive to manufacture and extremely convenient in operation.

Yet another object of the invention is the provision of a camper lifter device which can support the camper on its main frame during storage periods.

Other objects and many of the attendant advantages of the present invention will be readily appreciated as the same becomes better understood by reference to the following detailed description when considered in connection with the accompanying drawing in which the sole FIGURE is a perspective view of the preferred embodiment of the present invention.

DETAILED DESCRIPTION OF THE DRAWING

Referring the the drawing, a camper lifter device is shown generally at 11 with a camper illustrated in phantom thereon shown generally at 12. Camper lifter device 11 has front frame member 13, adjustably coupled between two side frame members 16 and 17. Side members 16 and 17 have reinforcing structures 18 and 19, respectively, attached thereto. A front wheel assembly consisting of bar 19, pivotally attached to front frame member 13, at 20A, and rotatably carrying a pair of wheels 21 and 22. Side frame members 16 and 17 have downward extensions 23 and 24, respectively, which rotatably carry rear wheels 26 and 27, respectively.

Two lifting assemblies shown generally at 31 and 32 are slidably attached by brackets 33 and 34 and brackets 36 and 37, respectively, to side frame members 16 and 17, respectively. Lifting assemblies 31 and 32 have vertically disposed structural members 38 and 39, respectively, slidably carrying sleeves 41 and 42, respectively. Triangular lifters 43 and 44 are carried by sleeves 41 and 42, respectively, and have lower horizontal lifing struts 46 and 47, respectively. Struts 46 and 47 are constructed of angle iron having their open face inboard for grasping the lower edges of camper 12. A lift cable 51 is wrapped around a drum 52 with a ratchet 53 and a handle 54. Cable 51 extends on each side of drum 52 to pulleys 56 and 57 associated with lifting assemblies 31 and 32, respectively. Cable 51 extends up vertical tubes 38 and 39 to pulleys 58 and 59, respectively, and attach to lifting sleeves 61 and 62, respectively.

Structural member 66 is slidably received by mounting sleeves 67 and 69 and is clamped thereto by wing bolts 68 and 71, respectively. Mounting sleeves 67 and 69 are coupled to side members 16 and 17, respectively. Structural member 72 is slidably received by mounting sleeves 73 and 76, respectively, which are coupled to side frame members 16 and 17, respectively. Wing bolts 74 and 77 clamp structural member 72 to mounting sleeves 73 and 76, respectively.

OPERATION

Assuming a camper 12 is resting on the ground or suitable slats which would slightly elevate it, the lifter device is first partially disassembled with structural members 66 and 72 removed. The lifter device is then moved into position with side members 16 and 17 outboard of each side of camper 12. At this point, cable drum 52 is rotated for lengthening the lifter frames 43 and 44, effectively lengthening cable 51 to position lifter frames 31 and 32 to where angle iron members 46 and 47 can be disposed beneath the outside and lower edges of camper 12. Crank 54 rotates drum 52, effectively shortening cable 51 and raising lifter frames 43 and 44, together with camper 12 until camper 12 is at the desired height for placement on a truck bed, for example. Obviously, the reverse would be true when it is desired to lower camper 12 to a floor or ground level. Brackets 33, 34, 36, and 37 are adjustable for placing the lifter frames 43 and 44 at approximately the center of gravity of a given camper.

When it is desired to store the camper off a truck bed for a period of time or, when it is desired to leave it on the lifter device unattended, the camper is first elevated via lifter assemblies 31 and 32 and structural members 66 and 72 inserted within the mounting sleeves 67 and 69 and 73 and 76, respectively. Wing bolts 68, 71, 74 and 77 are tightened and the camper lowered until the bottom of the camper rests on structural members 66 and 72. This leaves the camper in a much more stable position on the lifter device since it is not hanging by cables but resting firmly on an integrated frame. Obviously it can be wheeled into a conveninet location and left until it is desired to remount the camper onto a truck bed. It should be understood, of course, that the foregoing disclosure relates to only a preferred embodiment of the invention, and that it is intended to cover all changes and modifications of the example of the invention herein chosen for the purposes of the disclosure, which do not constitute departures from the spirit and scope of the invention.

I claim:

1. A lifter device for lifting and transporting campers comprising:
 a frame having first and second side members and an end member, said first and second side members and end member being substantially co-planar, said end member being adjustably attached to said first and second side members;
 first and second lifting assemblies slidably attached to said first and second side members, respectively, whereby said first and second lifting assemblies are forwardly and reversably adjustable to a camper carried thereon, said first and second lifting assemblies including first and second lifting bars, respectively;
 a lifting cable assembly coupled to said first and second lifting bars and operable for raising and lowering said lifting bars on said lifting assembly; and
 first and second structural members removably attached on top of said first and second side members, said first and second structural members being inwardly and outwardly adjustably secured and positioned for carrying said camper thereon.

2. The camper lifter device of claim 1 and further including:
 first and second lifting sleeves slidably carried by said first and second lifting assemblies, respectively; and
 first and second triangular lifters carried by said first and second lifting sleeves, respectively, each of said triangular lifters having one horizontal side dimensioned for carrying a camper therebetween.

* * * * *